BEST AVAILABLE COPY

E. CHAMBERLIN.

Improvement in Whip Sockets.

No. 4,787. Reissued March 5, 1872.

Witnesses

C. D. Kellum

M. Herrick

Inventor.

Edwin Chamberlin

AM. PHOTO-LITHOGRAPHIC CO. N.Y. (OSBORNE'S PROCESS.)

BEST AVAILABLE COPY

UNITED STATES PATENT OFFICE.

EDWIN CHAMBERLIN, OF LANSINGBURG, ASSIGNOR, BY MESNE ASSIGNMENTS, TO HIMSELF AND JOHN O. MERRIAM, OF TROY, NEW YORK.

IMPROVEMENT IN WHIP-SOCKETS.

Specification forming part of Letters Patent No. 43,896, dated August 23, 1864; reissue No. 2,387, dated November 6, 1866; reissue No. 4,787, dated March 5, 1872.

*To all whom it may concern:*

Be it known that I, EDWIN CHAMBERLIN, of Lansingburg, in the county of Rensselaer and State of New York, have invented a new and Improved "Whip-Socket Fastening;" and I do hereby declare the following to be a full, clear, and exact description of the same, reference being had to the accompanying drawing which forms a part of this specification, and in which like letters represent and refer to like or corresponding parts.

Figure 5:
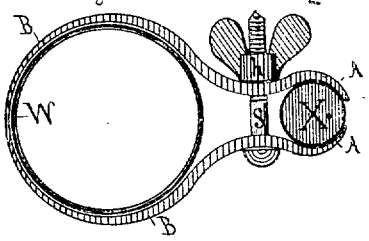
Figure 2:
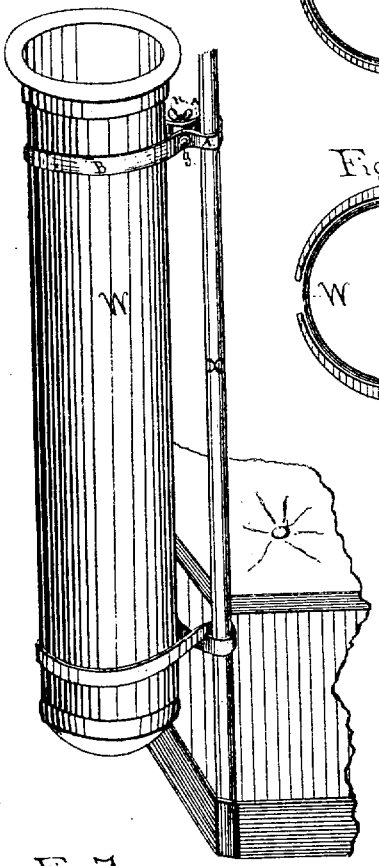
Figure 1:
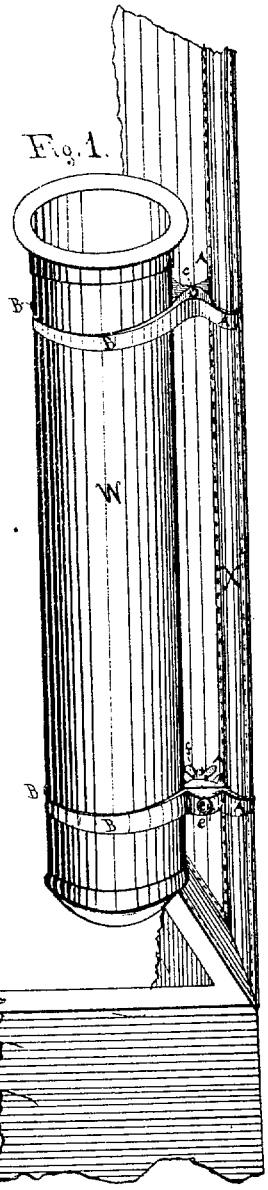
Figure 3:
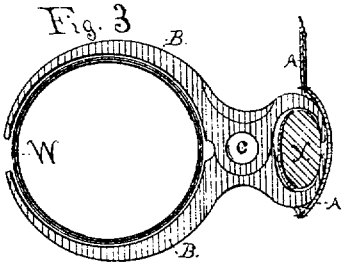
Figure 4:
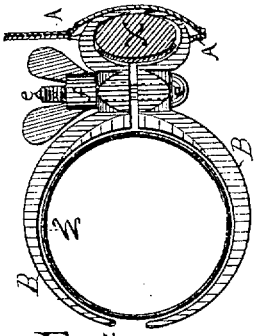
Figure 7:
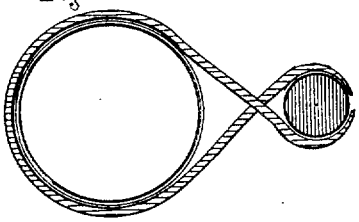
Figure 6:
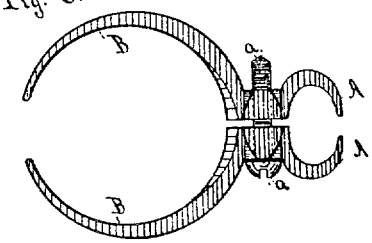

Figure 1 represents a whip-socket secured, by means of my invention, to a rod or bar in one end of a carriage-dash. Fig. 2 also represents a whip-socket fastened to a rod or bar in the railing at or near the end of a driver's seat of a carriage. Fig. 3 represents a whip-socket fastening which may be used at or near the upper end of the whip-socket; while Fig. 4 represents a device which may be used to secure the lower end of the socket to the dash-rail, substantially as herein described. Fig. 5 is a plan of the upper fastening, shown at Fig. 2, with sections of the whip-socket and dash-rod. Fig. 6 is a section of a modification of my said fastening. Fig. 7 is a plan of the lower fastening shown at Fig. 2.

Prior to my said invention, whip-sockets were attached to the dash-rail or other suitable part of the carriage by means of leather straps and buckles, by cutting holes through the leather of the dash and passing the strap through the same, and around the socket and rail, and then fastened by a buckle. The defect in this mode of fastening was that after the socket had been in use for a short time the straps would stretch, allowing the socket to sag, and the weight of the socket and whip would tear the leather of the dash.

The nature of my invention consists in obviating the difficulty above described by the employment of one or more clamps for the purpose of fastening a whip-socket to the dash-rail of a carriage, substantially as herein described.

To enable others skilled in the art to which my invention relates to make and use the same, I will here proceed to describe the construction and operation of the same, which is as follows, to wit:

The said clamp or fastening may be made of malleable iron or any other material which will answer the required purpose. A A, at all the figures, are jaws or clamps for griping or clamping the rod *x*, being a portion of the dash-rail of a carriage. B B are jaws for the purpose of holding or griping the whip-socket W. The said jaws A A and jaws B B are made and cast upon or with the bars A′ A′; these bars are held in place by means of a suitable screw passing through both of them in any convenient manner, and which screw is represented at *a c f g* of the accompanying drawing, and is for the purpose of forcing together the said pairs of jaws, so that they will, respectively, clasp and firmly hold the said dash-rod and socket. The said clamp or fastening A A are placed at a suitable distance apart on the rod *x*, and the said whip-socket W is then inserted in the said jaws B B, in the manner substantially as shown in the accompanying drawing. I use any convenient and suitable form and construction of said clamp for the purposes aforesaid, several modifications of which are shown in the accompanying drawing. The said jaws or clamps may be secured together in their required place and position by a pivot, C, Fig. 3, or by a screw, *a*, Fig. 6, or by a screw-bolt, *e*, and thumb-nut *f*, Fig. 4, or by any other suitable mechanical means. The jaws or clamps A A may be placed at the ends of a bar extending entirely around the whip-socket, and held together by a screw between the socket and the rod, as shown at Fig. 5, and the upper fastening at Fig. 2; or, instead of the pivot and screw, the bar may be crossed, as shown at Fig. 7, and at the lower fastening, Fig. 2, and the rod clasped or clamped by the elasticity of the bar or ring inclosing the whip-socket.

By these means I am enabled to obviate the practical defects of the fastening in use prior to my invention.

Having thus described the construction and operation of my invention, what I claim as new, and desire to secure by Letters Patent of the United States, is—

The employment of one or more clamps in combination with a whip-socket, for the purpose of fastening the same to the dash-rail or other suitable part of a vehicle.

In testimony whereof I have hereunto set my hand February 10th, 1872.

EDWIN CHAMBERLIN.

Witnesses:
C. D. KELLUM,
M. HERRICK.